(No Model.) 2 Sheets—Sheet 1.
O. MOSIER.
FOOT SUPPORT FOR WOOD CHOPPERS.
No. 459,300. Patented Sept. 8, 1891.
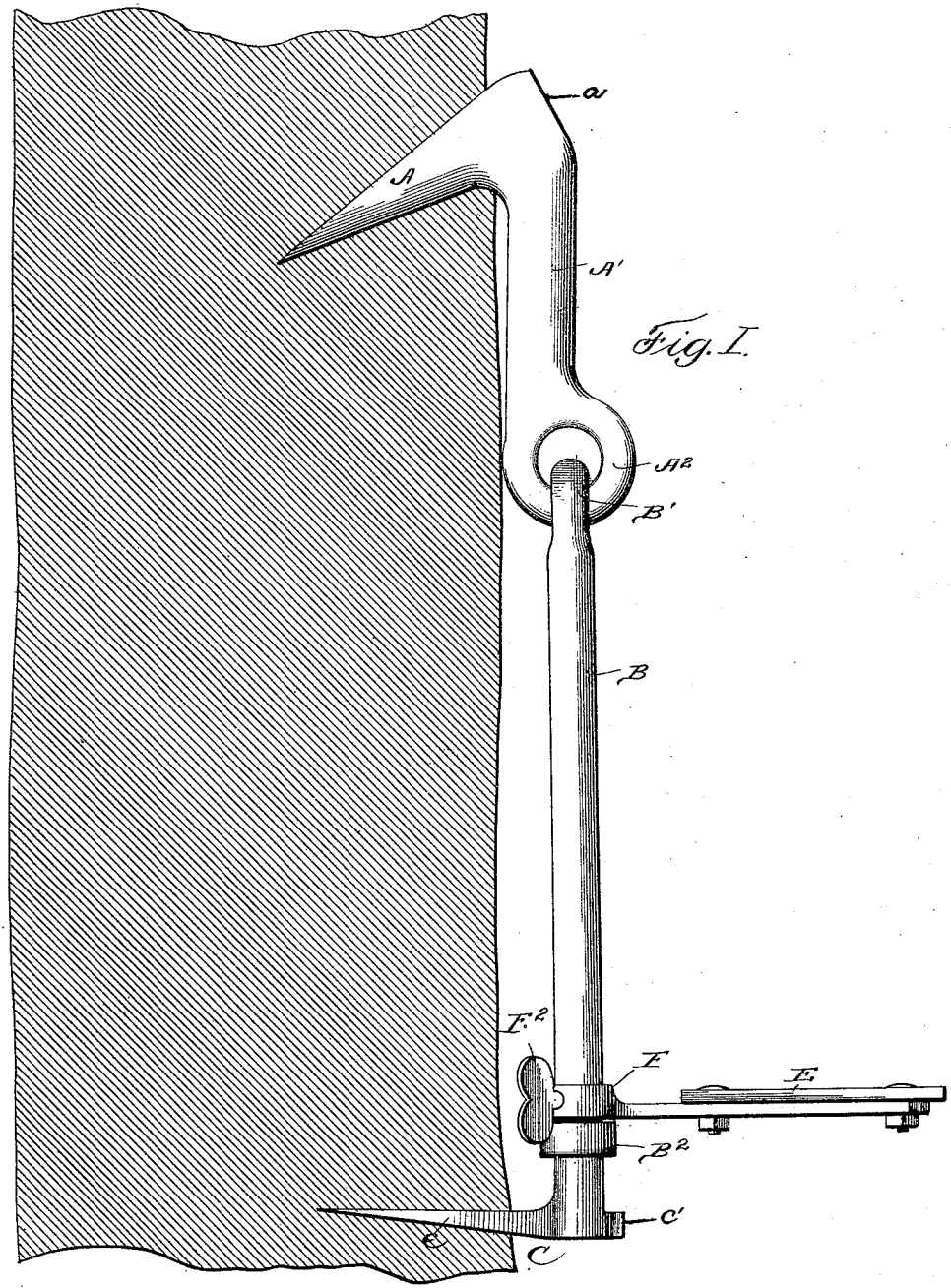

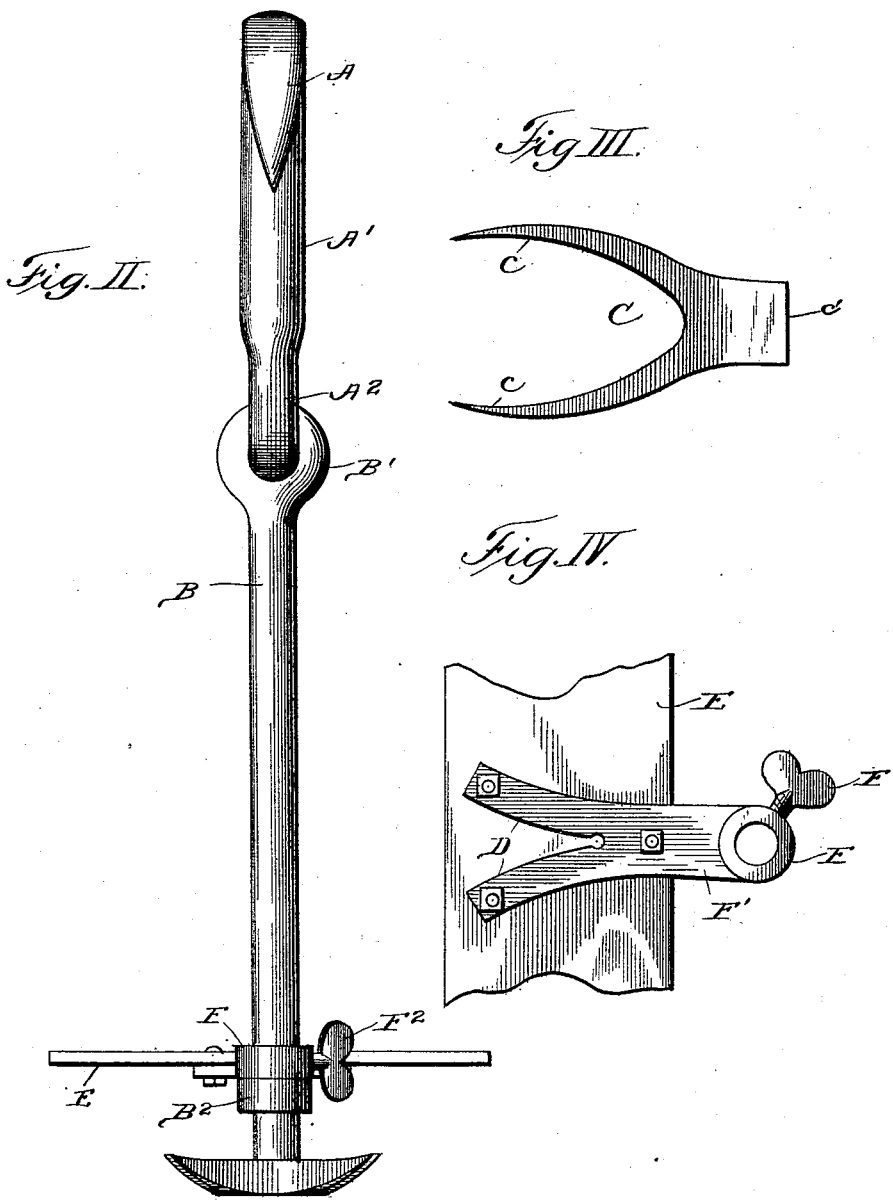

UNITED STATES PATENT OFFICE.

OSIA MOSIER, OF BUCKLEY, WASHINGTON.

FOOT-SUPPORT FOR WOOD-CHOPPERS.

SPECIFICATION forming part of Letters Patent No. 459,300, dated September 8, 1891.

Application filed December 27, 1890. Serial No. 375,991. (No model.)

*To all whom it may concern:*

Be it known that I, OSIA MOSIER, a citizen of the United States, residing at Buckley, in the county of Pierce and State of Washington, have invented certain new and useful Improvements in Foot-Supports for Wood-Choppers; and I do hereby declare that the following specification is a full, clear, and exact description of my invention, such as will enable those skilled in the art to which it appertains to make and use the same.

The object of my invention is to provide a new and improved support or elevated scaffold adapted to be attached to a tree and afford a firm footing for a lumberman while sawing or chopping down large trees.

It is well known that in felling large trees which are to be made into rafts and floated down rivers it is necessary to cut them some distance above the roots in order to get rid of the heavy lower end, which would sink, and in order to accomplish this scaffoldings of various descriptions are employed with more or less success. My improved foot-support accomplishes this result in a most satisfactory manner; and it consists, essentially, of an adjustable platform supported upon a vertical shaft, which is adapted to be securely attached to a tree or other object by means of a dog formed integral with one end and a hook linked to the other end of said shaft.

I attain the objects above referred to by the mechanism illustrated in the accompanying drawings, in which—

Figure I is a section of a tree with my device attached. Fig. II is a rear elevation of the device. Fig. III is a bottom view of the dog for securing the lower end of the device. Fig. IV is a detail plan view of the platform or bracket detached from the rest.

A is a hook provided with body portion A', a flattened head $a$, and an eye $A^2$.

B is a bolt or shaft provided at its upper end with an eye B', which is joined to the eye $A^2$, and at its lower end with a two-pronged dog C, having tines $c$ and a squared head $c'$. The device is attached to a tree by driving in the hook A and dog C.

D is a bracket having secured thereto by bolts or other suitable means a platform E and provided with a cylindrical socket F on an extension F', which socket fits the shaft B and is adapted to slide vertically thereon.

$B^2$ is a flange or collar formed integral with the shaft B. This flange forms a support for the bracket D.

$F^2$ is a thumb-screw seated in a screw-threaded perforation in the wall of socket F and adapted to impinge against the shaft B and secure the bracket in any desired vertical position on said shaft. By means of said thumb-screw the angle of the bracket on the shaft can also be adjusted to suit, so that the lumberman can reach a greater portion of the tree-trunk without detaching the device from the tree.

The hook A and dog C, which are provided with a squared rear portion or head to facilitate driving them into the tree, are arranged so as to incline toward each other when driven into the tree, as shown in Fig. I.

It is obvious that my improved foot-support could be employed for other purposes with equally beneficial results.

In applying the device to a tree or other object the hook A is first driven in, and then the dog C, and it will be observed that as the hook A and dog C are inclined toward each other they lock each other into position, and thus securely attach the device to the object.

Having thus described my invention, the following is what I claim as new therein and desire to secure by Letters Patent:

1. A bracket-scaffold or foot-support consisting of a shaft, a dog secured to the shaft and adapted to be driven into an object for attaching one end of said shaft, a hook linked to said shaft and also adapted to be driven into the object for supporting the other end of said shaft, and a bracket adjustably supported upon said shaft, as herein set forth.

2. A bracket-scaffold or foot-support consisting of a shaft, a dog formed integral with one end thereof for securing it to an object and a hook linked to the other end for securing it to the object, a flange or collar formed on said shaft, and a bracket provided with a socket adjustably supported on said shaft and adapted to be seated on said flange, as herein set forth.

3. A bracket-scaffold or foot-support consisting of a shaft, a dog formed integral with one end thereof, a hook linked to the other end, and a bracket adjustably supported on said shaft, said dog and said hook being arranged so as to incline toward each other when driven into position, whereby they lock each other securely into engagement with the object, as herein set forth.

4. A bracket-scaffold or foot-support consisting of a shaft, a dog C, formed integral with one end of said shaft and provided with tines $c$ and a squared head $c'$, a hook A, linked to the other end of said shaft and provided with a flattened head $a$, and a bracket E, adjustably supported upon said shaft, as herein set forth.

OSIA MOSIER.

Witnesses:
A. A. KNIGHT,
H. M. MUMFORD.